Dec. 18, 1962 J. O. BYERS, JR 3,068,805
PRESSURE BALANCING MEANS FOR ROTARY END VALVING SURFACES
Filed June 12, 1958 3 Sheets-Sheet 1

Fig. 1

INVENTOR.
JAMES O. BYERS, JR.
BY
William O. Hickey
ATTORNEY

Dec. 18, 1962     J. O. BYERS, JR     3,068,805
PRESSURE BALANCING MEANS FOR ROTARY END VALVING SURFACES
Filed June 12, 1958     3 Sheets-Sheet 2

INVENTOR.
JAMES O. BYERS, JR.
BY
William O. Hickey
ATTORNEY

Dec. 18, 1962 J. O. BYERS, JR 3,068,805
PRESSURE BALANCING MEANS FOR ROTARY END VALVING SURFACES
Filed June 12, 1958 3 Sheets-Sheet 3

INVENTOR.
JAMES O. BYERS, JR.
BY
William P. Hickey
ATTORNEY

United States Patent Office 3,068,805
Patented Dec. 18, 1962

3,068,805
PRESSURE BALANCING MEANS FOR ROTARY END VALVING SURFACES
James O. Byers, Jr., St. Joseph, Mich., assignor to The Bendix Corporation, a corporation of Delaware
Filed June 12, 1958, Ser. No. 741,639
6 Claims. (Cl. 103—161)

The present invention relates to means for holding rotary end valving surfaces into sliding sealing engagement with each other; and more particularly to positive displacement pumps and/or motors of the type in which fluid is communicated and discharged from a rotating member through end valving surfaces that are held into sliding sealing engagement with each other by a hydraulic balancing piston.

An object of the present invention is the provision of a new and improved balancing arrangement for hydraulic machinery of the type in which pressure fluid is conducted to and from an internal rotating member through sliding sealing valving surfaces, and which valving surfaces are held together by a hydraulic slipper piston to which a constant pressure is supplied without the use of check valves.

Another object of the present invention is the provision of a new and improved radial piston pump and/or motor having a single hydraulic balancing piston for urging its end sliding sealing valving surfaces into engagement with each other, and in which full discharge pressure is continually supplied to the balancing piston through an auxiliary valving arrangement in the sliding sealing valving surfaces and intercommunicating passage means in the rotor member communicating the balance piston to the auxiliary valving surface.

The invention resides in certain constructions and combinations and arrangements of parts; and further objects and advantages will become apparent to those skilled in the art to which the invention relates from the following description of the preferred embodiments described with reference to the accompanying drawings forming a part of this specification, and in which:

While the invention may be otherwise embodied, it is herein shown and described as embodied in a positive displacement hydraulic pump capable of producing pressures in the neighborhood of approximately 1,500 p.s.i. The pump is intended for use in the central hydraulic systems of farm tractors and the like.

The pump shown in the drawing generally comprises an outer casing member A having an internal chamber 10 therein containing a radially inwardly facing annular camming surface 12; and an inner member B having a plurality of radially outwardly extending cylinder bores 14 in which individual pistons 16 are positioned in a manner to be reciprocated by the camming surface 12 during relative rotation of the inner and outer members. The casing member in the present instance is a stationary one, and the internal member B is adapted to be rotated relative to the camming surface 12 by an axially positioned shaft 18 which extends through one end wall 20 of the casing member A. The inner end of the shaft 18 is journaled in a sleeve bearing 22 that is supported in an axial bore 24 in the opposite end wall 26 of the casing member A; and the projecting end of the shaft 18 is suitably journaled and sealed with respect to the end wall 20. The center portion of the shaft is suitably splined to the inner rotor member B substantially on the radial plane passing through the cylinder bores 14.

Each of the individual pistons 16 are provided with a ball 28 for engagement with the camming surface 12; and upon rotation of the shaft 18, centrifugal force causes the individual pistons 16 to be biased radially outwardly into firm engagement with the camming surface 12. Relative rotation between the inner and outer members causes the pistons 16 (of which there are 6 in the present pump) to be reciprocated in their cylinder bores 14. By properly communicating each cylinder bore 14 to a supply of fluid at a low pressure when its piston 16 is moving radially outwardly, and by properly communicating each cylinder bore to the discharge passages of the pump when its piston 16 is moving radially inwardly, a pumping action is established. By successively valving each of the cylinder bores to the suction and discharge connections of the pump during their respective suction and discharge strokes, a continuous flow of fluid is achieved.

Inasmuch as the position and duration of the suction and discharge strokes for each cylinder are fixed by the configuration of the camming surface 12; and inasmuch as the camming surface is held stationary with respect to the casing member A, the start of the suction stroke for each cylinder will take place when each cylinder moves into precisely the same position relative to the casing member A, and will continue over precisely the same circular arc of the casing member. Likewise, the discharge stroke for each cylinder starts when each moves into precisely the same position and continues over the same circular arc of the casing member. Fluid can be added to and taken from each of the individual cylinders, therefore, by successively valving each of the cylinders to suction and discharge passages in the casing member when the cylinders are properly positioned in the housing member relative to the camming surface 12.

The pump shown in the drawing has a generally elliptically shaped camming surface 12, so that each individual cylinder has two pumping cycles during each revolution of the rotor member B. Valving of each individual pumping cylinder to the suction and discharge connections of the pump is accomplished by a rotary disc valve arrangement formed between the end of the rotor member B and the end wall 26 of the casing member A. The rotary disc valve arrangement shown generally comprises a pair of matching valving surfaces which slidingly sealingly engage each other, and one of which surfaces 30 is formed in and rotated by the rotor member B while the other valving surface 32 is supported on the casing member A. In order that sealing angular alignment of these surfaces can be accomplished easily when the pumps are made on a mass production basis, the matching valving surfaces 30 and 32 are spherically shaped; and in order that the valving operation can be adjusted relative to the camming surface to vary the discharge of the pump (as will later be described), the valving surface 32 is formed as a surface of a port plate 36 which can be angularly positioned relative to the casing member A.

Figure 4:
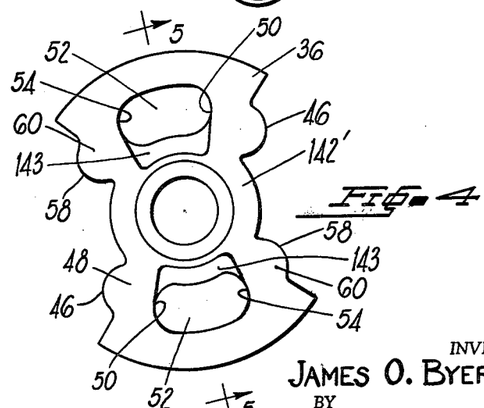
FIGURE 4 is an end view of a porting plate shown in FIGURES 1 and 2.

The pump shown in the drawing is intended to handle an oil having considerable lubricating qualities, and has been designed to permit fluid from the suctioned connection 38 of the pump to be distributed through an annular groove 40 in the end wall 26 to the internal chamber 10 of the pump. The valving surface 30 of the rotor member B is provided with a plurality of identically shaped circular ports 42 each of which communicate with a respective cylinder bore 14; and these ports 42 are uncovered by the port plate 36 to permit fluid from the internal chamber 10 to be drawn into the cylinder bores during their suction strokes. The ports 42 must, therefore, be sealed off from the internal chamber 10 during their discharge strokes; and inasmuch as the camming surface 12 causes these discharge strokes to be produced over two diametrically opposite 90° arcs, the port plate 36 has an "hour glass type" of configuration, as best seen in FIGURES 2 and 4, capable of sealing off the ports 42 from the internal chamber 10 over two diametrically opposite 90° arcs.

Figure 1:
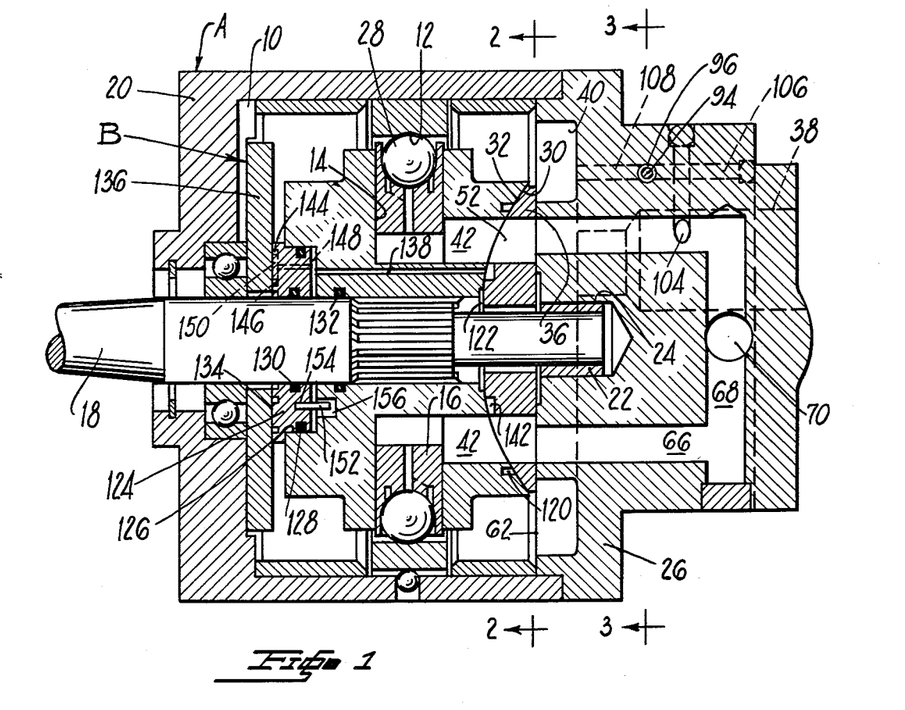
FIGURE 1 is a cross sectional view taken approximately on the line 1—1 of FIGURE 3 of a hydraulic pump embodying principles of the present invention.
Figure 2:
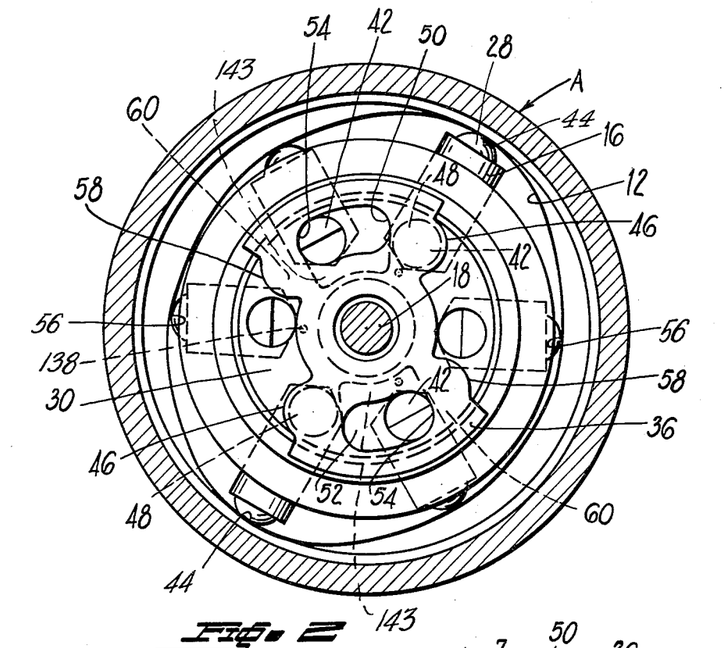
FIGURE 2 is a cross sectional view taken approximately on the line 2—2 of FIGURE 1.

Referring now to FIGURE 2 of the drawings, the port plate 36 is shown therein in its position providing maximum displacement for the pump. Assuming counterclockwise rotor rotation as seen in FIGURE 2, the pistons 16 start their discharge strokes when the center line of their cylinder bores 14 become coincident with the major axis 44 of the camming surface. When the center line of the ports 42 become coincident with the major axis 44, the trailing edge of the ports 42 become coincident with the leading edge 46 of the leading sealing surface 48 of each half of the port plate's valving surface 32, and the ports 42 become sealed off from both the suction and discharge connections of the pump for the following approximately 3° of rotor rotation. Approximately 3° of rotor rotation after the cylinder bores 14 pass the major axis 44, the leading edge of the circular ports 42 become coincident with the leading edge 50 of an arcuately shaped discharge port 52 that is centrally positioned within each half of the port plate 36. Thereafetr subsequent rotation of the rotor member causes the circular ports to start the opening operation of the discharge ports 52 which continues for approximately 32° of rotor rotation. The leading edge 50 and the trailing edge 54 of the discharge ports 52 are formed to the same radius as the circular ports 42, and about centers which are spaced 23° of rotation apart so that the circular ports 42 remain full open with respect to the discharge ports 52 for the next approximately 23° of rotation. Thereafter the leading edge of the circular ports 42 begin to move past the trailing edge 54 of the discharge port 52; and after approximately 32° of further rotation, the trailing edge of the circular ports 42 become coincident with the trailing edge of the arcuately shaped discharge port 52 to close off the ports 42 from both the suction and discharge of the pump. This occurs as the center lines of the individual cylinder bores 14 become coincident with the minor axis 56 of the camming surface 12; and the circular ports 42 are valved off from both the suction and discharge of the pump thereafter for approximately 3° of rotor rotation.

The leading edge of the ports 42 become coincident with the trailing edge 58 of the trailing portion 60 of the valving surface 32 after the cylinder bores 14 have moved approximately 3° past the minor axis 56 of the camming surface 12; and the individual circular ports 42 will remain in communication with the internal chamber 10 or suction passages of the pump until the trailing edge of the ports 42 become coincident with the leading edge 46 of the other half of the valving surface 32—which occurs when the center line of the cylinder bores 14 become coincident with the major axis 44. This completes one suction and discharge cycle as occurs over 180° of rotor rotation; and thereafter the cycle is repeated with respect to the other half of the porting plate 36 during the second 180° of rotor rotation.

The port plate 36 slidably sealingly engages a planar surface 62 in the end wall 26 of the casing member A in which are located a pair of diametrically opposed discharge ports 64 with which the arcuately shaped discharge ports 52 of the porting plate always communicate. The ports 64 are formed by longitudinally drilled passageways 66 which are intersected by a transverse drilling 68 which in turn is intersected by the discharge port 70 of the pump.

As previously indicated the port plate 36 is made arcuately movable in order that the pumps displacement, or quantity of fluid which will be delivered the pump during one revolution of the rotor, might be varied. By rotating the port plate 36 in a clockwise direction from the position shown in FIGURE 2, the individual circular ports 42 will be valved off by the leading portion 48 of the valving surface 32 prior to the time that the radially outward stroke of the individual pistons 16 have been completed; so that only a fraction of each cylinder bore's maximum displacement is filled with fluid from the inlet of the pump. The individual circular ports 42 will thereafter be valved off from both the suction and discharge connections of the pump for approximately 3° of rotor rotation; and thereafter the individual circular ports 42 will be connected with the arcuately shaped discharge port 52 in the port plate 36 so that fluid will be taken into each cylinder from the discharge of the pump for the remainder of each piston's suction stroke. Inasmuch as the port plate 36 is proportioned to connect the individual circular ports 42 to the discharge of the pump for approximately 87° of rotor rotation, movement of the center line of the cylinder bores 14 pass the major axis 44 of the camming surface causes fluid to be forced out through the discharge ports 52 and 64. Discharge through these ports continues past the major axis 44 through an angular displacement of the remainder of 87° of rotation, which will now terminate before the cylinder bores 14 reach the minor axis 56. Thereafter the ports 42 will be valved off from both the suction and the discharge of the pump for approximately 3°; and will then be communicated with the suction of the pump during the remaining portion of the discharge stroke of the individual pistons 16. It will therefore be seen that by angularly displacing the porting plate 36, part of the suction stroke for each cylinder bore 14 will be taken up with fluid obtained from the discharge ports of the pump; and a corresponding fluid displacement of the discharge stroke for each cylinder bore 14 will be passed to the suction of the pump. By this expediency the total quantity of fluid passing the outlet of the pump per rotor revolution can be varied or controlled by adjusting the angular position of the porting plate 36 relative to the camming surface 12.

Figure 3:
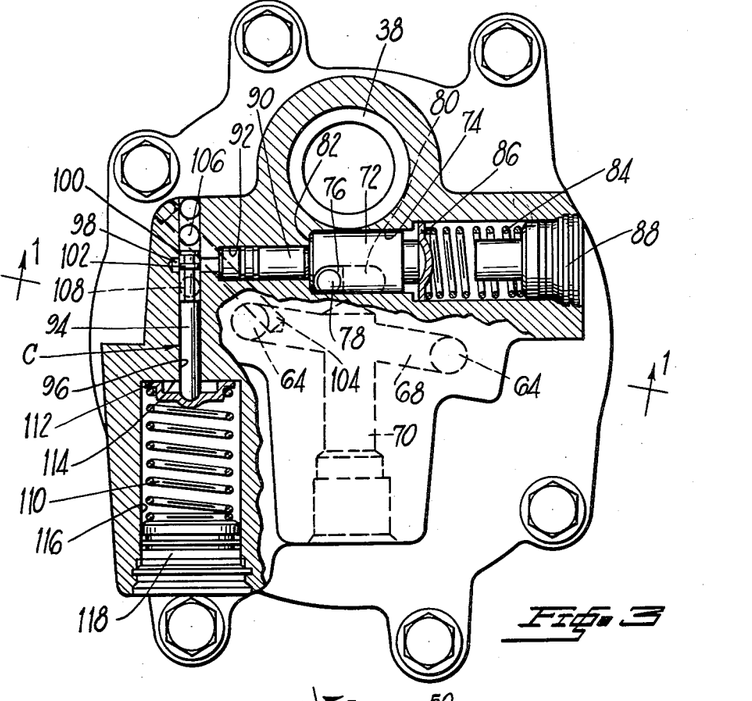
FIGURE 3 is an end view of the pump shown in FIGURE 1 having parts broken away and sectioned approximately upon the line 3—3 of FIGURE 1.

The pump shown in the drawing is provided with automatic means for angularly positioning the port plate 36 in a direction decreasing the displacement of the pump when the pressure in its discharge passages exceeds a predetermined pressure, which in the present instance is approximately 1,500 p.s.i. The automatic means C for positioning the port plate is best seen in FIGURE 3 of the drawings; and generally comprises a cylindrically shaped slide member 72 which is positioned in a transverse bore 74 in the cover plate 26. The slide member 72 is notched out as at 76 to receive a pin 78 that extends through an arcuately shaped opening 80 within the cover plate 26 that communicates the bore 74 with the back of the port plate 36. Pin 78 is rigidly connected to the port plate 36; and the port plate 36 is held in its maximum displacement producing position, shown in FIGURE 2, when the inner end of the slide member 72 is held into engagement with a shoulder 82 formed on the inner end of the transverse bore section 74. The slide 74 is held in this position by a coil spring 84 which is biased against an abutment plate 86 positioned against the outer end of the slide member 72 and a closure member 88 which is suitably held in place in the outer end of the transverse bore 74.

The slide member 72 is adapted to be moved in a direction reducing the displacement of the pump by a piston 90 that is positioned in a smaller diameter bore section 92 in the bottom end of the bore 74; and which in turn is actuated by pressure supplied to its inner surface. Pressure actuation of the piston 90 is in turn controlled by a slide valve structure 94 which is adapted to communicate the bottom end of the piston 90 to the suction pressure of the pump until such time as the discharge pressure of the pump reaches a predetermined level of approximately 1,500 p.s.i. Thereafter, the slide valve structure 94 is moved to modulate discharge pressure of the pump to the cylindrical piston 90 causing the slide member 72 to be moved outwardly compressing the spring 84 and moving the pin 78 in a direction decreasing the displacement of the pump.

The slide valve structure 94 is positioned in a bore 96 which intersects another small diameter bore 98 that communicates with the inner end of the bore section 92. The slide valve structure is provided with a pair of spaced lands 100 and 102 which when properly positioned will just straddle the bore 98 and close off the portions of the bore 96 which lie on opposite sides of the bore 98 from communication with the cylindrical piston 90. Pressure from the discharge passage 66 is fed through two intersecting bores 104 and 106 to the inner end portion of the bore 96. The outer portion of the bore 96 is communicated with the annular suction groove 40 by a longitudinal drilling 108; so that either suction or discharge pump pressures can be communicated to the cylindrical piston 90 depending upon the positioning of the slide valve structure 94. The slide valve structure 94 is biased inwardly to normally communicate suction pressure to the inner end of the cylindrical piston 90 by a coil spring 110 which normally holds an abutment plate 112 that is positioned against the end of the slide valve member 94 into engagement with the bottom end of the counterbore 116 in which the spring 110 is situated. The spring 110 is compressed a predetermined amount by a plug 118 which is forced into the outer end of the counterbore 116 and suitably held in place. When a predetermined pump discharge pressure, which in this instance is approximately 1,500 p.s.i. is delivered to the inner end of the bore 96 the slide valve structure 94 is biased outwardly against spring 110 to cause the abutment plate 112 to begin to move out of engagement with the bottom end 114 of the counterbore 116. This causes the land 102 to begin to throttle flow between the exhaust drilling 108 and the inner end of the cylindrical piston 90; and inasmuch as some leakage always occurs past the lands 100 and 102 discharge pressure from the drilling 106 will flow past land 100 to the drilling 98. Inasmuch as outlet flow from the drilling 98 to the exhaust drilling 108 is now being throttled, a control pressure is established in the drilling 98 which will be of an intensity which depends upon the relative overlap being maintained with respect to the lands 100 and 102. At a pump discharge pressure of approximately 1,650 p.s.i. pressure on the inner end of the slide valve 94 will cause the inner land 100 to be moved out of overlap with respect to the inner end of the bore 96, and sufficient pressure will be delivered against the cylindrical piston 90 to move the port plate 36 into its "no flow" position. At pump discharge pressures between 1,500 p.s.i. and 1,650 p.s.i. a proportionate pressure will be delivered against the cylindrical piston 90 to cause the port plate 36 to assume intermediate positions.

Pressure from the arcuately shaped discharge ports 52 in the port plate 36 will, of course, tend to flow through the space between the valving surfaces 30 and 32 and will tend to bias the valving surfaces apart. Should the surfaces become separated, discharge from the cylinder bores 14 will be short circuited directly to the internal chamber 10 thereby greatly decreasing the pumps hydraulic efficiency. The valving surfaces 30 and 32 must therefore be biased together by an amount of force which will prevent excessive leakage between the valving surfaces. In order that the pressure seepage between the valving surfaces might be confined to as small an area as possible, and thereby decrease the amount of force tending to bias the valving surfaces apart, an annular groove 120 is formed in the surface 30 a short distance radially outwardly from the radially outer edge of the arcuately shaped discharge ports 52. Similarly an axially positioned recess 122 is formed in the rotor member B with its radially outer edge positioned a short distance radially inwardly from the inner edge of the arcuate shaped discharge ports 52. It will therefore be seen that pressure forces upon the port plate are confined to its area bounded by the annular groove 120, the axially positioned recess 122 and its leading and trailing edges 46 and 58 respectively. A full discharge pressure will be exerted against the rotor member B on areas defined by the arcuately shaped discharge ports 52 and the pressure distribution on the remainder of the area bounded as previously set forth, will vary from substantially full pump discharge pressure adjacent the arcuate opening 52 to substantially suction pressure around the outer edges of the area previously set forth. An approximation of the force biasing the valving surfaces apart can be obtained by adding: the force obtained by multiplying the area which is in sliding sealing engagement by a pressure which is approximately one half of the difference between suction and discharge pressures, and the force obtained by multiplying full discharge pressure to the area of the arcuately shaped discharge ports plus the area of all circular ports 42 which are communicated to pressure.

According to principles of the present invention, the valving surfaces 30 and 32 are forced into sliding sealing engagement with each other with a generally predetermined force by a single annular balancing piston 124 which extends around the shaft 18. The annular piston 124 is preferably confined to an area that is as close as possible to the shaft 18; and in the embodiment shown in the drawing, is positioned in a counterbore 126 in the end of the opening in the rotor member B through which the shaft extends. O-ring seals 128 and 130 are provided between the annular piston 124 and the sidewalls of the counterbore and shaft respectively; and another O-ring seal 132 is provided in the shaft opening of the rotor member inwardly from the counterbore 126. The outer surface 134 of the annular piston 124 bears against an annular abutment or slipper plate 136 which is non-rotatably supported on the end wall 20 of the casing member A surrounding the shaft 18. Fluid under discharge pressure is admitted to the inner surface of the annular piston 124 to force the annular piston into abutment with the slipper plate 136 to produce a reaction which holds the valving surface 30 of the rotor member B into sealing engagement with the valving surface 32 of the port plate 36. The cross sectional area of the annular piston 124 is preferably of such a size so as to at all times bias the valving surfaces 30 and 32 together by an amount sufficient to prevent excessive flow between the valving surfaces.

According to further principles of the present invention, pressure is supplied to the counterbore 126 from the discharge passages of the pump through an auxiliary valving arrangement in the rotary valving surfaces 30 and 32 and a plurality of interconnecting passageways 138 which are drilled through the rotor member B to communicate the counterbore 126 with the auxiliary valving surfaces. The passageways 138 will preferably be symmetrically located with respect to the longitudinal axis of the pump and will communicate with an annular area 142 in the valving surface 30 of the pump which is at all times sealed off from the internal cavity or suction chamber of the pump by an annular cooperating area 142′ on the port plate 36. In the preferred embodiment shown in FIGURES 1 through 5, a depression or recess 143 is milled into the portion of the annular area 142′ adjacent the discharge ports 52 so that pressure from the discharge ports will be continually communicated with the recessed portions 143 of the annular area 142′. As the individual interconnecting passageways 138 rotate past the areas 143, full discharge pressure will be communicated to the counterbore 126; and by suitably arranging the arcuate length of the recesses 143 and the number (N) of the passageways 138, an arrangement can be provided wherein one of the passageways will always be in communication with the areas 143 to thereby always communicate the discharge pressure of the pump to the balancing piston 124. In the preferred embodiment shown in FIGURES 1 through 5, three equally spaced passageways 138 are utilized, and the areas 143 are positioned and formed so that the passageways 138 move into communication with the area 143 at approximately the same time that the adjacent port 42 moves into communication with the discharge ports 52; and similarly the passageways 138 move out of engagement with the areas 143 when the adjacent port 42 moves out of communication with the ports 52. In the embodiment shown, the individual passageways, since there are three in number, will be in communication with the areas 143 for approximately 60° of rotor rotation; and inasmuch as there are two ports 52 and three interconnecting passageways 138, there will always be one of the passageways 138 in communication with one of the areas 143 (see FIG. 2). The number of ports will be hereinafter referred to by the symbol "X" and it is a factor in determining the arcuate length of the ports.

Figure 5:
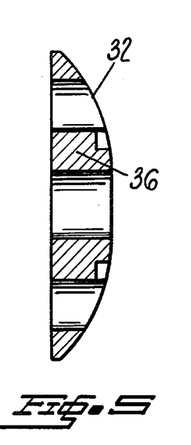
FIGURE 5 is a cross sectional view taken approximately on the line 5—5 of FIGURE 4.
Figure 6:
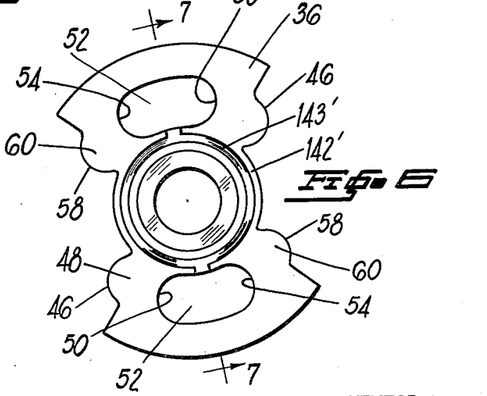
FIGURE 6 is an end view of a porting plate of another embodiment of the invention.

A further embodiment of the invention is shown in FIGURES 5 and 6 wherein an annular groove 143′ extends around auxiliary valving surface 142′ and into which discharge pressure is continually communicated so that only one interconnecting passageway 138 is needed to continually communicate full discharge pressure to the balancing piston 124.

In order to lubricate the sliding surface between the annular piston 124 and the slipper plate 136, a pair of concentric annular grooves 144 and 146 are provided in the outer surface 134 of the annular piston. Fluid under pressure from the counterbore 126 flows through a passageway 148 in the annular piston, and then through a groove 150 in the surface 134 which extends between the recesses 144 and 146. The same pressure that is delivered against the inner edge of the annular piston 124 is therefore delivered to the sliding surface between the piston 124 and slipper plate 136 to relieve the mechanical bearing forces between these surfaces. The annular area between the grooves 144 and 146 is sized in such a way that the hydraulic forces tending to separate the annular piston 124 from the slipper plate 136 will at all times be slightly less than the force against the end of the annular piston 124 positioned in the counterbore 126; and as previously indicated the annular piston 124 is so sized as to hold the valving surfaces 30 and 32 together. Rotation of the annular piston 124 relative to the shaft 18 is prevented by a pin 152 which extends into aligned opening 154 and 156 in the piston 124 and rotor member B, respectively.

Describing now the operation of the pump with the porting plate 36 in its maximum flow producing position shown in FIGURE 2, fluid enters through the pump suction 38 to the annular groove 40 where it is distributed uniformly to the internal chamber 10 of the pump. With the port plate 36 in the position shown in FIGURE 2, the circular ports 42 in the rotor member B will be in communication with the internal chamber 10 for substantially the full suction stroke of their pistons 16, and until the center line of the bores 14 are coincident with the major axis 44 of the camming surface 12. The ports 42 are valved off from both the internal chamber 10 and the discharge port 52 for the next 3° of rotor rotation. At approximately 3° of rotation after the center line of the cylinder bores have passed the major axis 44, the circular ports 42 become communicated with the arcuately shaped discharge port 52 so that inward movement of the pistons 16 causes fluid to flow out through the ports 42, and the arcuately shaped discharge port 52 to one of the discharge ports 64 in the removable end wall 26 of the casing member. Inasmuch as the camming surface 12 is elliptically shaped to produce two pumping cycles during each revolution of the rotor member, flow simultaneously proceeds through both of the diametrically opposed drilled passageways 66 to the transverse drilling 68 and out through the discharge port 70 of the pump. When the center line of the cylinder bores 14 reach the minor axis 56 of the camming surface 12, the trailing edge of the circular ports 42 move out of engagement with the arcuately shaped discharge port 52 to valve off the cylinder bores 14 from both the suction and discharge connections of the pump. The ports 42 remain sealed off from both of the suction and discharge passages of the pump for the next 3° of rotation, or until their center lines have moved approximately 3° of rotation past the minor axis 56; and thereafter the leading edge of the circular ports 52 move past the trailing edge 58 of the port plate 36 to establish communication with the suction of the pump. The ports 42 remain in communication with the pump suction for approximately 87° of rotation thereafter; and the entire cycle will thereafter be repeated with respect to the diametrically opposed portion of the port plate 36.

As previously indicated, the amount of fluid discharged from the pump can be varied or regulated by rotation of the port plate 36 with respect to the camming surface 12 of the casing member. Angular displacement of the port plate 36 with respect to the casing member A is accomplished by the structure best shown in FIGURE 3, and which comprises a slide member 72 that is normally biased into its maximum flow producing position by the coil spring 84. The slide 72 is caused to angularly displace the port plate 36 in a direction reducing the output of the pump when a pressure exceeding approximately 1,500 p.s.i. is supplied to the piston 90 which abuts the inner end of the slide member 72. When the discharge pressure of the pump exceeds approximately 1,500 p.s.i., the spool valve structure 94 moves outwardly to compress spring 110 sufficiently to cause land 102 to lap with respect to bore 96. Thereafter variable leakage rates past the lands 100 and 102 causes increasing control pressure to be delivered against the piston 90 which in turn causes the slide 72 to compress spring 84 and rotate the port plate 36. The port plate 36 will be rotated by increasing amounts as the discharge pressure exceeds 1,500 p.s.i.; and when approximately 1,650 p.s.i. discharge pressure is reached, the slide member 72 will abut plug 88 and the port plate 36 will be rotated to its "no flow" producing position for the pump. As the discharge pressure of the pump falls below 1,650 p.s.i. the reverse operation is produced; and it will therefore be seen that the pump is capable of adjusting its rate output to correspond with the consumption of the hydraulic system to which it is connected. The precise manner in which angular displacement of the port plate 36 reduces the displacement of the pump has previously been set forth in detail and will not further be described.

Figure 7:
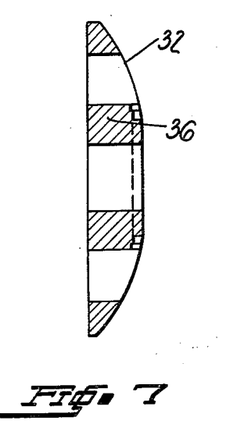
FIGURE 7 is a cross sectional view taken approximately on the line 7—7 of FIGURE 6.

The pump shown in the drawing will preferably also include a plurality of springs, not shown, interpositioned between the balancing piston 124 and the rotor member B to provide an initial hold-down force between the rotary valving surfaces 30 and 32 during the starting operation of the pump. As pressure is developed in the discharge passages of the pump, pressure will flow from the discharge ports 52 in the port plate into the recesses 143 of the auxiliary valving surfaces so that the individual interconnecting passageways 138 will periodically be brought into communication with the discharge port 52 to supply full discharge pressure to the balancing piston 124. Inasmuch as the pump shown in the drawing provides two pumping cycles per rotor revolution and three interconnecting passageways 138 are provided in the rotor member B which are of a generally small diameter, the arcuate length of the recesses 143 are approximately 60° so that one of the interconnecting passageways will at all times be in communication with one of the pressure recesses 143. Recesses 143 are diametrically opposite to each other and may be positioned around the port plate in any angle relative to the discharge ports 52, and in the embodiment shown in the drawing are positioned so that the passageways 138 will move into communication with the recesses 143 at the time the center line of the pistons coincide with the major axis 44 of the pump. Each passageway 138 will remain in communication with the recess 143 for approximately 60°, whereafter it will be valved off by the annular valving surface 142' for 120° until it is brought into engagement with the opposite recess 143. Inasmuch as three passageways 138 are provided, there will always be one of the passageways in communication with one of the recesses 143 to provide continual pressure discharge communication to the balancing piston 124. In the embodiment represented by FIGURES 6 and 7, the recess 143 is made annular to extend around the auxiliary valving surface 142' so that only one interconnecting passageway 138 need be provided to continually communicate pressure discharge to the balancing piston 124.

As previously indicated, some of the fluid supplied to the recess 122 passes through passageway 148 to the annular grooves 144 and 146 thereby pressurizing the abutting surface of the annular piston 124 and slipper plate 136 thereby reducing the direct bearing force between their sliding surfaces. As previously indicated the hydraulic force tending to separate these surfaces is less than the pressure force on the inner end of the annular piston biasing them into engagement, which force in turn is greater than the hydraulic pressure forces tending to separate the valving surfaces 30 and 32 by an amount preventing excessive flow therebetween. A continuing amount of leakage occurs out of the grooves 144 and 146 as well as past the O-rings 128, 130 and 132, which flow is replaced by inlet pressure fluid through the passageway 138.

It will be apparent from the above that there has been provided an auxiliary valving arrangement for supplying a full and non-pulsating pressure flow to a balancing piston of a rotary positive displacement fluid handling device which will hold its end valving surfaces into sealing engagement with each other. The system does not employ check valves or other movable parts which can malfunction and endanger the operation of the device, and the system is simple and rugged in design, inexpensive to manufacture, and efficient in operation.

Where more than one interconnecting passageway 138 is used, only portions of the valving surface 142' need be subjected to pressure; and for any given number N of passageways 138, the total angular arc to which pressure must be communicated will be approximately $$\frac{360°}{N}$$

Inasmuch as the area of the auxiliary valving surface 142' to which pressure is communicated, increases the separating forces of the valving surfaces, it will in many instances be desirable to use a plurality of passageways so that the size of the balancing piston 124 might be reduced accordingly. It will further be desirable in many instances to symmetrically arrange the areas 143 about the axis of the rotor; and where this is done, the individual pressure areas 143 will preferably be of equal arcuate length as represented by the formula $$\frac{360°}{xN}$$

where $x$ is the number of portions into which the pressure area is to be divided.

It will be apparent that the objects heretofore enumerated as well as others have been achieved, and that an improved balancing piston arrangement and its pressurizing system has been provided for fluid devices having end valving surfaces which are biased apart by pressure fluid between the valving surfaces. While the invention has been described in considerable detail, I do not wish to be limited to the particular constructions shown and described; and it is my intention to cover hereby all novel adaptations, modifications, and arrangements thereof which come within the practice of those skilled in the art to which the invention relates and which come within the scope of the following claims.

I claim:
1. In a fluid handling device: an outer casing member having first and second opposite end walls forming an internal chamber therein and through which end walls an axis of rotation extends; an internal member in said chamber; said casing and internal member being rotatable relative to each other; one end wall of said casing member and the adjacent end of said internal member having respective valving surfaces which are in sliding sealing engagement with each other and which define areas of high and low pressure that are exerted against said end of said inner member; said valving surfaces each having an annular area extending around said axis which is at all times sealed off from said low pressure area, the opposite end of said internal member and said second opposite end wall of said casing member having respective juxtapositioned surfaces supported thereon which face each other, one of said respective juxtapositioned opposite end surfaces having an axial recess therein; a balance piston in said recess effecting a seal with respect to the sidewalls of said recess, said balance piston engaging with the other of said juxtapositioned surfaces; each of said annular areas of said valving surfaces having at least one port therein adapted to slide over at least one port in the other of said annular areas, said ports in one of said annular areas being communicated to high pressure and the ports in the other of said annular areas being communicated to said recess, and said ports being arranged so that there will be at least one port in one annular surface in communication with a port in the other of said annular surfaces during substantially 360 degrees of relative rotation, whereby said valving surfaces are forced into sliding sealing engagement with a generally constant predetermined force.

2. In a fluid handling device: an outer casing member having first and second opposite end walls forming an internal chamber therein and through which end walls an axis of rotation extends; an internal member in said chamber; said casing and internal member being rotatable relative to each other; one end wall of said casing member and the adjacent end of said internal member having respective valving surfaces which are in sliding sealing engagement with each other and which define areas of high and low pressure that are exerted against said end of said inner member; said valving surface of said inner member having a port therein which is alternately communicated with said high and low pressure areas during relative rotation of said members; said one end wall of said casing member and its adjacent end of said relatively rotatable internal member having annular portions extending around said axis and disposed in slidable bearing relationship, which annular portions are at all times sealed off from said low pressure area, the opposite end of said internal member and the opposite end wall of said casing member having respective juxtapositioned surfaces supported thereon which face each other, said respective juxtapositioned surface of said inner member having an axially positioned recess therein; a balance ring in said recess effecting a seal with respect to the sidewalls of said recess, said balance ring having a surface which slidingly sealingly engages the juxtapositioned surface of said outer casing member; each of said annular areas of said valving surfaces having at least one port therein adapted to slide over at least one port in the other of said annular areas, said ports in said annular area of said casing member being communicated to high pressure and the ports in said annular area of said internal member being communicated to said recess, and said ports being arranged so that there will be at least one port in one annular surface in communication with a port in the other of said annular surfaces during substantially 360 degrees of relative rotation, whereby said valving surfaces and annular portions are forced into sliding sealing engagement with a generally predetermined force.

3. In a fluid handling device: an outer casing member having first and second opposite end walls forming an internal chamber therein and through which end walls an axis of rotation extends; an internal member in said chamber; said casing and internal member being rotatable relative to each other; one end wall of said casing member and the adjacent end of said internal member having respective valving surfaces which are in sliding sealing engagement with each other and which define areas of high and low pressure that are exerted against said end of said inner member; said valving surface of said inner member having a port therein which is alternately communicated with said high and low pressure areas during relative rotation of said members; the opposite end of said internal member and said second opposite end wall of said casing member having respective juxtapositioned surfaces supported thereon which face each other, said respective juxtapositioned surface of said inner member having an axially positioned recess therein; a balance ring in said recess having a seal with respect to the sidewalls of said recess, said balance ring having a surface which slidingly sealingly engages the juxtapositioned surface of said outer casing member; one of said valving surfaces having an annular port therein extending 360 degrees therearound and the other of said valving surfaces having a port adapted to register with said annular port, the one of said ports in said casing member being communicated to a high pressure and the other of said ports in said internal member communicating with said recess, whereby said valving surfaces are forced into sliding sealing engagement with a generally predetermined force.

4. In a fluid handling device: an outer casing member having first and second opposite end walls forming an internal chamber therein and through which end walls an axis of rotation extends; an internal member in said chamber; said casing and internal member being rotatable relative to each other; said first end wall of said casing member and the adjacent end of said internal member having respective valving surfaces which are in sliding sealing engagement with each other and which define areas of high and low pressure that are exerted against said end of said inner member; said valving surface of said inner member having a port therein which is alternately communicated with said high and low pressure areas during relative rotation of said members; said first end wall of said casing member and the adjacent end of said internal member each having an annular portion extending around said axis, which annular portions are in slidable engaging relation and are at all times sealed off from said low pressure area; the opposite end of said internal member and said second opposite end wall of said casing member having respective juxtapositioned surfaces supported thereon which face each other, said respective juxtapositioned surface of said inner member having an axially positioned recess therein; a balance ring in said recess having a seal with respect to the sidewalls of said recess, said balance ring having a surface which slidingly sealingly engages the juxtapositioned surface of said outer casing member; said annular portion of said casing member having at least one port therein to which high pressure is communicated and said annular portion of said internal member having N number of ports communicating with said recess, said at least one port of said casing member covering an angular arc which totals approximately 360/N degrees, means for communicating each of said ports of said internal member with said at least one port of said casing member when each of said ports of said internal member is within the angular arc covered by said at least one port.

5. In a fluid handling device: an outer casing member having first and second opposite end walls forming an internal chamber therein and through which end walls an axis of rotation extends; an internal member in said chamber; said casing and internal member being rotatable relative to each other; said first end wall of said casing member and the adjacent end of said internal member having respective valving surfaces which are in sliding sealing engagement with each other and which define areas of high and low pressure that are exerted against said end of said inner member; said valving surface of said inner member having a port therein which is alternately communicated with said high and low pressure areas during relative rotation of said members; and said first end wall of said casing member and the adjacent end of said internal member each having an annular portion extending around said axis, which annular portions are in sliding sealing engagement and are at all times sealed off from said low pressure area, said annular area of said casing member having at least one port therein to which high pressure is communicated; the opposite end of said internal member and said second opposite end wall of said casing member having respective juxtapositioned surfaces supported thereon which face each other, said respective juxtapositioned surface of said inner member having an axially positioned recess therein; a balance ring in said recess having a seal with respect to the sidewalls of said recess, said balance ring having a surface which slidingly sealingly engages the juxtapositioned surface of said outer casing member; and flow passages in said inner member extending between said recess and said annular portions there being only N number of generally equally spaced passageways, said total arc of approximately 360/N degrees being divided into approximately x generally equally spaced portions of approximately equal arcuate length, said casing member port covering a total arc of approximately 360/N degrees, and said passageways being spaced from each other at whole integers of 360/xN degrees whereby at least one of said passageways is in communication with high pressure at all times.

6. In a positive displacement fluid handling device: an outer casing member having first and second opposite end walls forming an internal chamber therein and through which end walls an axis of rotation extends; an internal rotor member in said chamber; said casing member supporting a radially inwardly facing camming surface positioned radially outwardly of said rotor member; an axially extending shaft extending through said second end wall of said casing member into said internal chamber for rotatably supporting said rotor member relative to said casing member; said rotor member having a plurality of radially outwardly opening cylinder bores which overlie said camming surface; a piston in each cylinder bore contructed and arranged to be reciprocated in its bore by said camming surface during relative rotation of said rotor and outer casing members; said first end wall of said casing member and the adjacent end of said rotor member having respective valving surfaces which are in sliding sealing engagement with each other and which define areas of high and low pressure that are exerted against said end of said rotor member; said rotor member having a flow communicating port for each cylinder bore extending between the radially inner end of each bore and the valving surface of said rotor member for alternate communication with said high and low pressure areas; said first end wall of said casing member and the adjacent end of said rotor member each having an annular portion extending around said axis and disposed radially inwardly of said valving surfaces, which annular portions are in slidable sealing relation and are at all times sealed off from said low pressure areas each of said annular portions having at least one port therein which communicates during relative rotation and which are supplied with high pressure, said second end wall of said casing member having an annular abutment surface surrounding said shaft and facing said rotor member; said rotor member having a counterbore therein extending around said shaft and facing said abutment surface; an annular balance ring in said recess in sealing engagement with the sidewalls thereof, said balance ring having an annular surface which slidingly sealingly engages said abutment surfaces, and flow passages in said rotor member extending between said recess and said ports in its annular portion, there being N number of ports in the annular portion of said rotor and $x$ number of ports in the annular portion of said casing member, the total angle subtended by said casing member ports being $360/N$ degrees, and the ports of said rotor being spaced $360/xN$ degrees.

References Cited in the file of this patent

UNITED STATES PATENTS

| | | |
|---|---|---|
| 2,299,751 | Magie | Apr. 8, 1919 |
| 2,257,724 | Bennetch | Oct. 7, 1941 |
| 2,284,109 | Vickers | May 26, 1942 |
| 2,698,585 | Cotner et al. | Jan. 4, 1955 |
| 2,741,993 | Orshansky | Apr. 17, 1956 |

FOREIGN PATENTS

| | | |
|---|---|---|
| 2,784 | Great Britain | May 29, 1913 |
| 1,122,271 | France | May 22, 1956 |
| 1,132,654 | France | Nov. 5, 1956 |

UNITED STATES PATENT OFFICE
CERTIFICATE OF CORRECTION

Patent No. 3,068,805                         December 18, 1962

James O. Byers, Jr.

It is hereby certified that error appears in the above numbered patent requiring correction and that the said Letters Patent should read as corrected below.

Column 3, line 36, for "Thereafetr" read -- Thereafter --; column 10, line 28, for "entends" read -- extends --; column 12, lines 49 to 51, strike out "said casing member port covering a total arc of approximately 360/N degrees" and insert the same after "ways," in line 47, same column 12.

Signed and sealed this 20th day of August 1963.

(SEAL)
Attest:

ERNEST W. SWIDER
Attesting Officer

DAVID L. LADD
Commissioner of Patents